United States Patent [19]

Meyer et al.

[11] Patent Number: 4,983,413
[45] Date of Patent: Jan. 8, 1991

[54] LOW-CALORIE POLYSILOXANE OIL FOOD PRODUCTS

[75] Inventors: Richard S. Meyer, Tacoma; James W. Duersch, Bonney Lake, both of Wash.

[73] Assignee: Curtice-Burns, Inc., Rochester, N.Y.

[21] Appl. No.: 485,786

[22] Filed: Feb. 23, 1990

Related U.S. Application Data

[62] Division of Ser. No. 204,048, Jun. 8, 1988, abandoned.

[51] Int. Cl.$^5$ .................................................. A23L 1/24
[52] U.S. Cl. .................................... 426/589; 426/601; 426/602; 426/605; 426/610; 426/611; 426/613
[58] Field of Search ............... 426/601, 602, 605, 607, 426/613, 589, 610, 611

[56] References Cited

U.S. PATENT DOCUMENTS

| | | | |
|---|---|---|---|
| 2,634,213 | 4/1953 | Martin | 426/544 |
| 2,934,472 | 4/1960 | May | 167/55 |
| 2,998,319 | 8/1961 | Babayan | 426/610 |
| 3,382,150 | 5/1968 | Grass et al. | 167/82 |
| 3,402,243 | 9/1968 | Gerow | 424/184 |
| 3,507,955 | 4/1970 | Osipow | 424/54 |
| 3,600,186 | 8/1971 | Mattson et al. | 426/611 |
| 4,127,650 | 11/1978 | Buehler | 424/184 |
| 4,146,619 | 3/1979 | Lover et al. | 424/184 |
| 4,806,374 | 2/1989 | Willemse | 426/601 |

OTHER PUBLICATIONS

"Information About Silicone Fluids: Dow Corning 200 Fluid, Food Grade, 350 cSt," Dow Corning Information Sheet (1983).

"Information About Silicone Fluids: Dow Corning 510, 550 and 710 Radiation Resistant Fluids," Dow Corning Information Sheet (1986).

E. Filippo Bracco, M.D., Nahla Baba, Ph.D. et al., "Polysiloxane: Potential Noncaloric Fat Substitute; Effects on Body Composition of Obese Zucker Rats," Am. J. Clin. Nutr., 46:784–789 (1987).

*Primary Examiner*—Jeanette Hunter
*Attorney, Agent, or Firm*—Christensen, O'Connor, Johnson & Kindness

[57] ABSTRACT

Low-calorie organopolysiloxane food products and methods for their preparation are disclosed. Low-calorie food products are prepared by replacing a portion of the oil with an organopolysiloxane compound having the following structure:

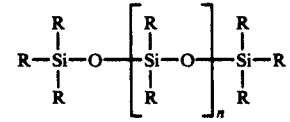

wherein R is selected from $C_1$–$C_6$ lower alkyl, phenyl, and combinations thereof. The low-calorie food products made include fried vegetables, such as potato chips, and food dressings, such as salad dressings and mayonnaise.

3 Claims, No Drawings

LOW-CALORIE POLYSILOXANE OIL FOOD PRODUCTS

This application is a divisional application based on prior copending application Ser. No. 07/204,048, filed on Jun. 8, 1988 now abandoned.

TECHNICAL FIELD

This invention relates to food compositions. More specifically, this invention relates to low-calorie food products containing a nonabsorbable, nondigestible liquid organopolysiloxane fat substitute.

BACKGROUND OF THE INVENTION

Fats contribute from 30-40% of the total calories consumed by most Americans. Both the American Heart Association and the National Cancer Institute have recommended that fat consumption be lowered to from 20-30% of the calories consumed. Despite these recommendations, successful reduction of fat consumption has not been achieved because of traditional American dietary habits. Therefore, the search for fat substitutes or low-calorie fats has attracted considerable attention in recent years.

Low-calorie food products comprising liquid polyol polyesters are disclosed in U.S. Pat. No. 3,600,186, issued Aug. 17, 1971 to Mattson et al. The Mattson et al. invention consists of low-calorie food compositions in which at least a portion of the fat content is replaced by a sugar fatty acid ester or a sugar alcohol fatty acid ester having at least four fatty acid ester groups.

U.S. Pat. No. 3,158,490 (1964) to Baur et al. discloses noncloudy salad oils containing esters of disaccharides, wherein there are not more than five unesterified hydroxyl groups.

An improvement to the Mattson et al. invention is disclosed in Jandacek, U.S. Pat. No. 4,005,195, issued Jan. 25, 1977, the improvement comprising adding an antianal leakage agent (AAL) in a sufficient amount to prevent frank leakage of the liquid polyesters through the anal sphincter.

An alternative to the low-calorie fatty acid polyester polyols described above is disclosed by Hamm in U.S. Pat. No. 4,508,746, issued Apr. 2, 1985. The Hamm invention comprises a "reverse ester" consisting of a polycarboxylic acid having two to four carboxylic acid groups esterified with saturated and unsaturated alcohols.

Other low-calorie fat substitutes that have been suggested include: neopentyl-type alcohols, triglyceride esters of α-carboxylic acids, diglyceride esters of short-chain dibasic acids, polydextrose, polygalactose, N-oil (tapioca dextrin), biopolymers, branched polysaccharides and jojoba oil.

Polysiloxanes have been used before in food compositions. Babayan, U.S. Pat. No. 2,998,316, discloses the use of organopolysiloxanes as an additive to vegetable oils to increase their smoke point. The preferred polysiloxanes are methyl and ethyl polysiloxanes, which are added to vegetable oil in amounts ranging from 1 to 25 parts per million.

More recently, polysiloxanes have been considered as potential low-calorie fat substitutes. Bracco et al., Am. J. Clin. Nutr. 46:784 (1987) has reported the use of organopolysiloxanes as potential fat substitutes. These authors demonstrated that obese Zucker rats fed ad libitum a diet containing 22% (wt/wt) methylphenylpolysiloxane (Dow-Corning 550 fluid) exhibited weight loss associated with a reduction in total body fat. Furthermore, these animals did not compensate for caloric dilution by increasing their food intake.

The potential for use of organopolysiloxanes to reduce fat consumption has gone unrealized because products acceptable for human consumption that contain or are prepared in these oils are unavailable. Accordingly, a need exists for food products in which all or a portion of the digestible fat content is replaced by a noncaloric fat substitute. Ideally, the noncaloric fat substitute should be one in which caloric dilution is not offset by increasing food intake. Furthermore, it would be highly desirable to employ the fat substitute in those food products which derive a substantial portion of the calories from fat.

SUMMARY OF THE INVENTION

This need has been met by providing a low-calorie organopolysiloxane food product and a method for its production. In one embodiment of the invention, a low-calorie fried vegetable product is provided. The fried vegetable product contains vegetable matter, such as potato, as well as about 0.05% by weight or more organopolysiloxane in which the organo moiety is selected from $C_1$-$C_6$ lower alkyl. Preferably, the organopolysiloxane residue remaining in the fried vegetable product is dimethylpolysiloxane. The method for producing this low-calorie fried vegetable product consists of contacting vegetable matter with an oil comprising at least about 0.05% by weight organopolysiloxane at a temperature effective to fry the vegetable matter.

This need is further met by providing a low-calorie food dressing in which the oil component of the food dressing consists of from 5% to 100% organopolysiloxane. The organo moiety of this organopolysiloxane is selected from $C_1$-$C_6$ lower alkyl and phenyl. Preferred food dressings suitable for use in conjunction with organopolysiloxane fat substitutes include pourable salad dressings and spoonable dressings (mayonnaise). For these products, it is preferred that at least a portion of the oil component be replaced by methylphenylpolysiloxane.

DETAILED DESCRIPTION OF A PREFERRED EMBODIMENT OF THE INVENTION

Broadly, the invention embodies low-calorie food products in which a portion of the oil content has been replaced by an organopolysiloxane compound represented by Formula I.

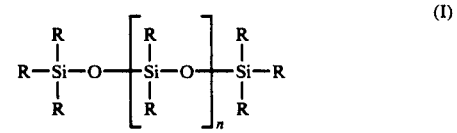

These compounds are organic derivatives of silica ($SiO_2$) in which the R groups are independently selected from $C_1$-$C_6$ lower alkyl and phenyl. These polymeric compounds are known to be chemically inert, nontoxic, and nonabsorbable oils. Their viscosities are similar to those of conventional oils, and can be adjusted depending upon the particular organic moiety selected for R in Formula I above.

These organopolysiloxane oils can be made by standard procedures known in the art or are available from commercial sources, such as SIGMA Chemical Company Catalog at 530, 532, St. Louis, Mo. (1987) or DOW-CORNING 200, 550, and 710 fluids, Dow-Corning Corporation, Midland, Mich. (1987).

One embodiment of the invention consists of a low-calorie fried vegetable product. The fried vegetable product consists of vegetable matter containing at least about 0.05% by weight organopolysiloxane, in which the organo moiety is selected from $C_1$-$C_6$ lower alkyl. The preferred organopolysiloxane oil is dimethylpolysiloxane. Vegetable matter suitable for use in conjunction with the fried vegetable product include, but are not limited to: potatoes, carrots, rice, green beans, and corn. The most preferred vegetable matter consists of potatoes used in the production of potato chips.

The invention further embodies a method for producing the low-calorie fried vegetable products described above. This method constitutes contacting the vegetable matter with an oil comprising at least about 0.05% by weight organopolysiloxane, at a temperature effective to fry the vegetable product. The temperature, pressure, and time necessary to produce the fried vegetable product of the present invention are known to those skilled in the art and will depend on the particular vegetable matter selected. By way of illustration, thin (5-mm) slices of potato are placed in a 95:5% blend of dimethylpolysiloxane and conventional frying oil at 375° F. for 1.5 to 5 minutes to produce an acceptable fried potato chip. Similarly, carrot slices are fried in the same polysiloxane oil blend at the same temperature for from 3 to 5 minutes to produce an acceptable fried carrot chip. Other fried vegetable products are produced by standard recipes, in which the frying oil is replaced with from 5 to 100% organopolysiloxane oil.

In an alternative embodiment of the invention, low-calorie food dressings are provided in which from about 5% to 100% of the oil fraction of the food dressing is replaced by organopolysiloxane oil. The organo moiety of the organopolysiloxane oil substitute is selected from $C_1$-$C_6$ lower alkyl and phenyl. Normally, food dressings, such as pourable salad dressing or spoonable dressing (mayonnaise), are as much as 80% oil. By replacing a portion or all of this oil with a nonabsorbable noncaloric organopolysiloxane oil, a substantial decrease in the percentage of calories derived from oils in foods of this type can be achieved. It has been found, however, that many organopolysiloxane oils are unsuitable for use in these food dressing products, because subjective properties such as appearance, flavor, texture, mouth feel, and the like, are unacceptable to the consumer. (See examples below.) It has been found that the preferred organopolysiloxane compound suitable for use in food dressings, such as pourable salad dressings and spoonable dressings (mayonnaise), is methylphenylpolysiloxane. This polysiloxane oil, when substituted for normal oils in from 5% to 100%, produces a low-calorie food dressing product with subjective properties that most closely approximate those of standard food dressing products.

Without further description, it is believed that one of ordinary skill in the art can, using the preceding description and illustrative examples, make and utilize the present invention to its fullest extent. The following working examples therefore specifically point out preferred embodiments of the present invention, and are not to be construed as limiting in any way of the remainder of the disclosure. In the examples to follow, the following subjective standards are employed: ++good; +fair, −poor.

EXAMPLE I

Fried Potato Chips

Potato chips were fried in DOW-CORNING methylphenylpolysiloxane (550 radiation-resistant fluid) and dimethylpolysiloxane (200 fluid, food grade 350 cSt.). Each polysiloxane fluid was heated to 375° F., to which sliced (5 mm), rinsed potatoes were added. The potato chips were cooked until a typical light-brown color was achieved. Both polysiloxane fluids produced acceptable chips having typical color and a bland, fried-potato flavor. The 200 fluid performed like standard frying oil. The 550 fluid displayed substantial foaming during the frying process. In addition, steam released from the potatoes during frying was trapped in the fluid, creating a cloudy emulsion. A 95:5% blend of the 550 to 200 oils reduced the foaming during frying, but the cloudy emulsion was still evident.

TABLE I

Fried Potato Chips

| Oil | | Appearance | Flavor | Crispness | Mouth Feel | Frying Behavior |
|---|---|---|---|---|---|---|
| a. | Standard | ++ | ++ | ++ | ++ | ++ |
| b. | Dimethylpolysiloxane | ++ | + | ++ | + | ++ |
| c. | Methylphenylpolysiloxane | ++ | + | ++ | + | − |
| d. | 5:95% blend b:c | ++ | + | ++ | + | − |

EXAMPLE II

Italian Salad Dressing

Italian salad dressing containing no thickener was prepared according to the following recipe:

| Ingredient | Percent by Weight |
|---|---|
| oil | 34.0 |
| water | 49.0 |
| vinegar | 9.0 |
| salt | 3.0 |
| other seasonings | 5.0 |
| TOTAL: | 100.0% |

Dressings in which the standard oil was substituted with the 200 and 550 fluids described in Example I were prepared. The resulting dressings were typical in appearance and flavor. The salad dressing made with the 200 fluid separated into phases more rapidly than normal. Dressing prepared using the 550 fluid separated slowly after shaking, but held the dressing ingredients in suspension in a manner typical of a good commercial Italian dressing that contains thickening agents to keep ingredients in suspension.

TABLE II

Italian Salad Dressing

| Oil | | Appearance | Phase Separation | Flavor | Mouth Feel |
|---|---|---|---|---|---|
| a. | Standard | ++ | + | ++ | ++ |
| b. | Dimethylpolysiloxane | ++ | − | ++ | ++ |
| c. | Methylphenylpolysiloxane | ++ | ++ | ++ | ++ |

EXAMPLE III

Mayonnaise

A spoonable dressing was prepared from the polysiloxane oils described in Example I according to the following recipe:

| Ingredient | Percent by Weight |
| --- | --- |
| oil | 80.0 |
| whole eggs | 16.5 |
| vinegar (120 gr) | 2.0 |
| sugar | 1.0 |
| salt | 0.5 |
| TOTAL: | 100.0% |

In preparing spoonable salad dressings according to the above recipe, it was necessary to chill the polysiloxane fluids to from 40° to 45° F. to ensure proper emulsification. Mayonnaise produced with the 550 fluid was typical in appearance and flavor when compared to standard mayonnaise. The product produced from the 200 dimethylpolysiloxane fluid was pale yellow in color and translucent, rather than the opaque white characteristic of standard mayonnaise. The flavor of the mayonnaise produced with the 200 fluid was good, even though the appearance and consistency was unusual.

TABLE III

| | Mayonaise | | |
| --- | --- | --- | --- |
| Oil | Appearance (color, transparency) | Flavor | Mouth Feel |
| a. Standard | ++ | ++ | ++ |
| b. Dimethylpolysiloxane | − | + | + |
| c. Methylphenylpolysiloxane | ++ | ++ | ++ |

While the invention has been described in conjunction with preferred embodiments, one of ordinary skill, after reading the foregoing specification, will be able to effect various changes, substitutions of equivalents, and alternatives to the subject matter set forth herein, without departing from the spirit and scope thereof. Hence, the invention can be practiced in ways other than those specifically described herein. It is therefore intended that the protection granted by Letters Patent hereon be limited only by the appended claims and equivalents thereof.

The embodiments of the invention in which an exclusive property or privilege is claimed are defined as follows:

1. A low-calorie food dressing comprising oil and non-oil components wherein the oil component comprises from about 5% to 100% methylphenylpolysiloxane.

2. The low-calorie food dressing of claim 1, selected from the group consisting of pourable salad dressing and spoonable dressing.

3. The low-calorie food dressing of claim 2, wherein said spoonable dressing is mayonnaise.

* * * * *